J. BEELER.
Heating Attachment for Cooking-Stoves.
No. 129,267.
Patented July 16, 1872.
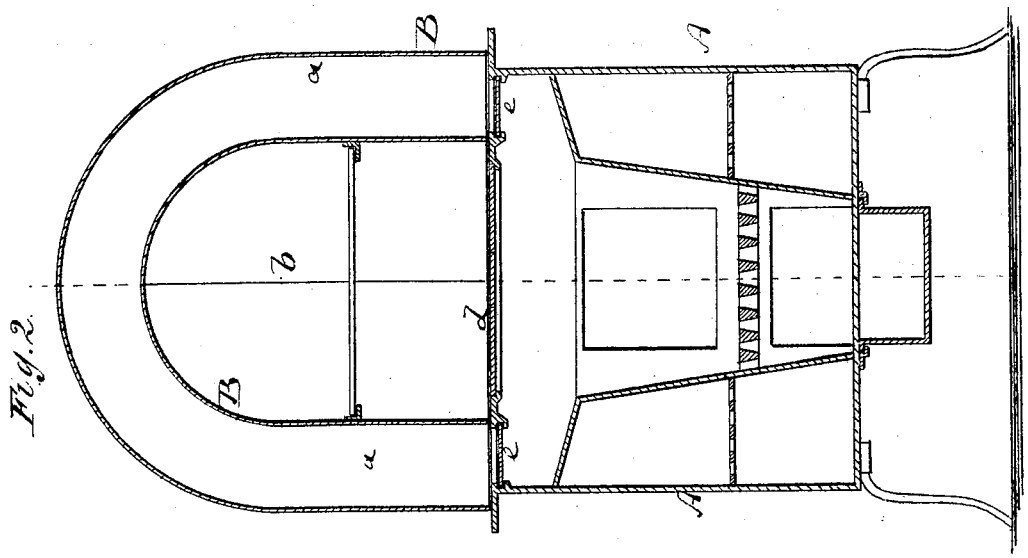
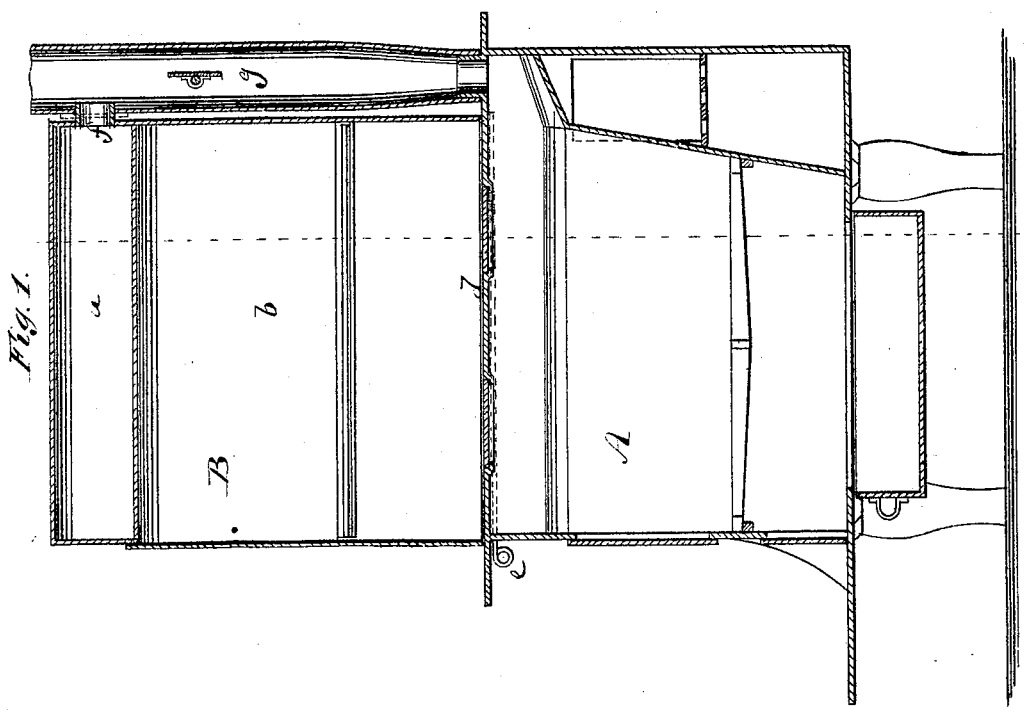
Witnesses:
E. Wolff
N. A. Graham
Inventor:
J. Beeler
Per Munn & Co.
Attorneys.

UNITED STATES PATENT OFFICE.

JOHN BEELER, OF BROWNSVILLE, MISSOURI, ASSIGNOR TO HIMSELF AND MORRIS MONHEIM.

IMPROVEMENT IN HEATING ATTACHMENTS FOR COOKING-STOVES.

Specification forming part of Letters Patent No. 129,267, dated July 16, 1872.

Specification describing a new and Improved Heater Attachment to Cooking-Stoves, invented by JOHN BEELER, of Brownsville, in the county of Saline and State of Missouri.

In the accompanying drawing, Figure 1 is a vertical longitudinal, and Fig. 2 a vertical transverse, section of my invention.

Similar letters of reference indicate corresponding parts.

This invention has for its object to supply a heater attachment to cooking-stoves, whereby the surplus heat of the latter will be utilized for baking, for keeping irons hot, and for other similar purposes. Especially in the summer season the invention will be of value wherever such heat is required for various purposes, as it makes the use of a separate heater and fire unnecessary.

A in the drawing represents a cooking-stove of suitable kind and size. B is the heater attachment placed upon the stove. The heater is preferably of arched form, and is hollow at the sides and top, forming an outer heating-compartment, $a$, around an inner receiving-compartment, $b$. Openings in the stove-cover $d$, which can be more or less regulated by slides $e$, admit the hot gases to the outer compartment $a$ of the heater B and cause the inner chamber $b$ to become heated to the desired degree. These gases can escape from the heater through a pipe, $f$, which enters the stove-pipe $g$. When the heater is not required it can be entirely taken off the stove and put aside, or the slides $e$ can be closed. The hole in the pipe $g$ for receiving the pipe $f$ is closed by a hinged or other plate when the heater is removed.

Having thus described my invention, I claim as new and desire to secure by Letters Patent—

The arrangement with the stove A, provided with openings in its cover $d$ having slides $e$, of the heater B, composed of the two curved or arched plates, forming the outer combustion-compartment $a$ and the inner receiving and heating compartment $b$, and the vertical pipe $g$ provided with a damper, and connected with said heater by the short pipe $f$, all as shown and described.

JOHN BEELER.

Witnesses:
    J. WENTWORTH,
    MORRIS MANHEIM.